(12) United States Patent
Shimizu et al.

(10) Patent No.: US 11,249,507 B2
(45) Date of Patent: Feb. 15, 2022

(54) LEVER DEVICE

(71) Applicant: HONDA MOTOR CO., LTD., Tokyo (JP)

(72) Inventors: Masahiro Shimizu, Wako (JP); Yoshinobu Shiomi, Wako (JP); Go Morita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/758,067

(22) PCT Filed: Oct. 23, 2018

(86) PCT No.: PCT/JP2018/039278
§ 371 (c)(1),
(2) Date: Apr. 22, 2020

(87) PCT Pub. No.: WO2019/130762
PCT Pub. Date: Jul. 4, 2019

(65) Prior Publication Data
US 2021/0191448 A1 Jun. 24, 2021

(30) Foreign Application Priority Data
Dec. 28, 2017 (JP) .............................. JP2017-252915

(51) Int. Cl.
*G05G 5/03* (2008.04)
*B62K 23/06* (2006.01)
*G05G 1/04* (2006.01)

(52) U.S. Cl.
CPC .............. *G05G 5/03* (2013.01); *B62K 23/06* (2013.01); *G05G 1/04* (2013.01)

(58) Field of Classification Search
None
See application file for complete search history.

(56) References Cited

U.S. PATENT DOCUMENTS

| 8,948,989 | B2 * | 2/2015 | Saitoh | F16D 48/06 |
| | | | | 701/67 |
| 2010/0234178 | A1 * | 9/2010 | Hayakawa | F16D 25/086 |
| | | | | 477/174 |
| 2016/0288864 | A1 * | 10/2016 | Kajihara | F16D 48/068 |

FOREIGN PATENT DOCUMENTS

| EP | 1985879 | 10/2008 |
| JP | 2012-096706 | 5/2012 |

(Continued)

OTHER PUBLICATIONS

International Search Report and Written Opinion for International Application No. PCT/JP2018/039278 dated Jan. 15, 2019, 8 pages.

*Primary Examiner* — Vicky A Johnson
(74) *Attorney, Agent, or Firm* — Amin, Turocy & Watson, LLP

(57) ABSTRACT

A clutch lever device (50) includes a clutch lever (60) rotatably provided and operated by a user, an elastic deformation portion (81) which is a generation source of an operation reaction force of the clutch lever (60), and a rotary body (91) which is configured to rotate around a first axis (O) in accordance with rotation of the clutch lever (60) and elastically deform the elastic deformation portion (81). The rotary body (91) is configured to change an elastic deformation amount of the elastic deformation portion (81) per unit rotation angle of the clutch lever (60) in accordance with a rotation angle from a pre-operation position of the clutch lever (60).

7 Claims, 11 Drawing Sheets

(56) References Cited

FOREIGN PATENT DOCUMENTS

| JP | 2012-096710 | 5/2012 |
|----|-------------|--------|
| JP | 5639142 | 12/2014 |

* cited by examiner

LEVER DEVICE

TECHNICAL FIELD

The present invention relates to a lever device.

Priority is claimed on Japanese Patent Application No. 2017-252915, filed Dec. 28, 2017, the content of which is incorporated herein by reference.

BACKGROUND ART

Conventionally, there is a clutch-by-wire system which electrically connects a clutch lever to a clutch device. For example, the clutch-by-wire system includes an actuator which drives the clutch device, an operation amount detection unit which detects an operation amount of the clutch lever, and an electronic control unit which controls an operation of the actuator on the basis of a detection value of the operation amount detection unit.

As the clutch-by-wire system, there is one including a mechanism for applying an operation reaction force to the clutch lever in order to produce an operation load of a conventional clutch lever mechanically connected to the clutch device by hydraulic pressure, a cable or the like (refer to, for example, Patent literature 1). In Patent literature 1, a transmission device including a clutch lever, and a plurality of coils which gradually change a rate of increase of the operation reaction force of the clutch lever using an action of respective biasing forces thereof in a stepwise manner is disclosed.

CITATION LIST

Patent Literature

[PTL 1]
Japanese Patent Publication No. 5639142

SUMMARY OF INVENTION

Technical Problem

However, in the transmission device described in Patent Literature 1, since the rate of increase of the operation reaction force abruptly changes with a predetermined grip amount, there is a possibility that an operator may feel discomfort.

An object of the present invention is to provide a lever device capable of allowing a lever to be operated with no discomfort.

Solution to Problem (1) A lever device according to one aspect of the present invention includes a lever (60) rotatably provided and operated by a user, an elastic deformation portion (81 or 181) which is a generation source of an operation reaction force of the lever (60), and a rotary body (91 or 191) which is configured to rotate around a first axis (O) in accordance with rotation of the lever (60) and elastically deform the elastic deformation portion (81 or 181), wherein the rotary body (91 or 191) is configured to change an elastic deformation amount of the elastic deformation portion (81 or 181) per unit rotation angle of the lever (60) in accordance with a rotation angle from a pre-operation position of the lever (60).

(2) In the lever device according to the aspect (1), the elastic deformation portion (81 or 181) may be formed to be elastically deformable in a first direction (X), the rotary body (91 or 191) may be provided to be engageable with the elastic deformation portion (81 or 181), and a line segment (L1) passing through the first axis (O) and a contact point (96 or 196) between the rotary body (91 or 191) and the elastic deformation portion (81 or 181) may be inclined with respect to the first direction (X) when seen in a direction of the first axis (O).

(3) In the lever device according to the aspect (2), an angle (θ) between the first direction (X) and the line segment (L1) may be equal to or more than 95° and equal to or less than 135° in a state in which the lever (60) is located at the pre-operation position and may increase as an operation amount of the lever (60) increases.

(4) In the lever device according to any one of the aspects (1) to (3), the elastic deformation portion (81) may be disposed on a side opposite to a side in which the lever (60) extends with respect to a rotation center of the lever (60).

(5) In the lever device according to any one of the aspects (1) to (4), the elastic deformation portion (81 or 181) may include a coil spring.

(6) In the lever device according to any one of the aspects (1) to (5), a roller (94) which is rotatable around a second axis (P) parallel to the first axis (O) may be disposed at a contact portion of the rotary body (91) with respect to the elastic deformation portion (81).

(7) The lever device according to any one of the aspects (1) to (6) may further include a rotation sensor (100) which detects the rotation angle of the lever (60), and the rotation sensor (100) may be disposed coaxially with a rotation center of the lever (60).

(8) In the lever device according to the aspect (7), the rotation sensor (100) may be disposed below the lever (60).

Advantageous Effects of Invention

According to the lever device of the aspect (1) of the present invention, since the restoring force of the elastic deformation portion is transmitted to the lever via the rotary body, it is possible to apply the operation reaction force to the lever. Further, since the elastic deformation amount of the elastic deformation portion per unit rotation angle of the lever varies according to the operation amount of the lever, a rate of increase of the operation reaction force with respect to an increase in the operation amount of the lever can be arbitrarily set by appropriately setting a degree of change in the elastic deformation amount of the elastic deformation portion per unit rotation angle of the lever. Therefore, the operation reaction force of the lever can be changed non-linearly and continuously with respect to the operation amount of the lever. Therefore, it is possible to allow the lever to be operated with no discomfort.

According to the lever device of the aspect (2), since the line segment is displaced by the rotation of the rotary body, an inclination angle of the line segment with respect to the first direction varies according to the operation amount of the lever. Therefore, the elastic deformation amount of the elastic deformation portion per unit rotation angle of the lever can be changed in accordance with the operation amount of the lever. Thus, it is possible to constitute a lever device exhibiting the above-described operation and effects.

According to the lever device of the aspect (3), as the operation amount of the lever increases, the elastic deformation amount of the elastic deformation portion per unit rotation angle of the lever decreases. As a result, the rate of increase of the operation reaction force of the lever decreases as the operation amount of the lever increases. Therefore, the operation reaction force of the lever increases to gradually approach a predetermined value as the operation amount of the lever increases. Accordingly, it is possible to approximate a characteristic in which the operation reaction force of the lever becomes substantially constant at the end of the operation, like an operation feeling of the clutch lever used in a conventional manual transmission.

According to the lever device of the aspect (4), it is possible to prevent the size of the lever device from becoming large in a direction in which the lever extends.

According to the lever device of the aspect (5), it is possible to form an elastic deformation portion which elastically deforms and presses the rotary body using the restoring force. Therefore, the lever device can be formed with a simple structure.

According to the lever device of the aspect (6), the rotary body can be brought into contact with the elastic deformation portion without sliding when the rotary body rotates. Therefore, it is possible to make an operational feeling of the lever smooth.

According to the lever device of the aspect (7), the rotation sensor can directly detect the rotation angle of the lever. Therefore, it is possible to accurately detect the rotation angle of the lever.

According to the lever device of the aspect (8), it is possible to prevent the rotation sensor from being disposed to protrude upward from the lever and hindering an operator.

DESCRIPTION OF EMBODIMENTS

Figure 1:
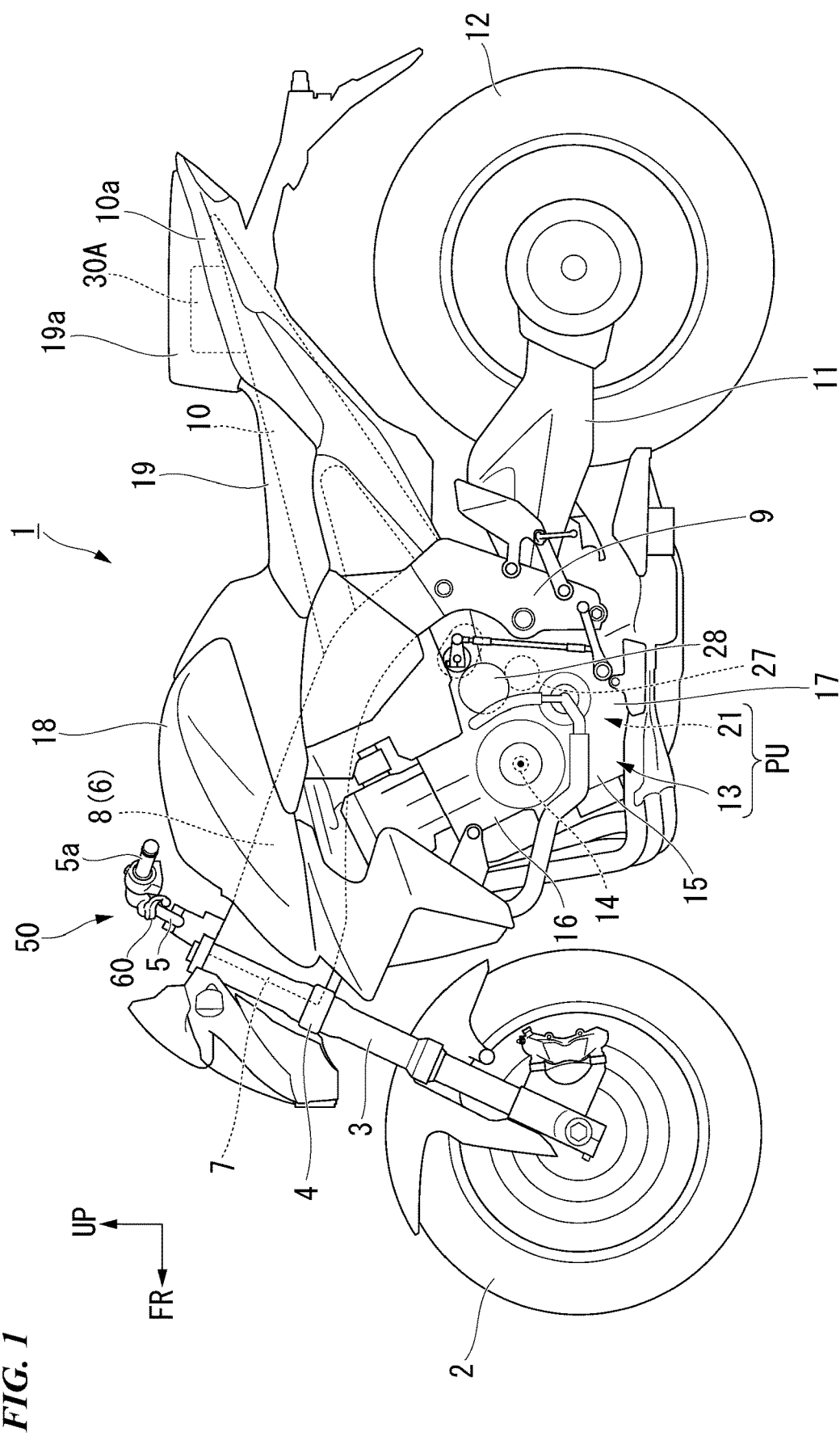
FIG. 1 is a left side view of a motorcycle according to a first embodiment.

Hereinafter, embodiments of the present invention are described with reference to the drawings. In the following description, directions such as forward, rearward, right and left are the same as those in a vehicle described below unless otherwise noted. Also, in the drawings used for the following description, an arrow FR indicating a front of the vehicle, an arrow LH indicating a left side of the vehicle, and an arrow UP indicating an upper side of the vehicle are shown at appropriate positions. Further, in the following description, components having the same or similar functions are designated by the same reference numerals. Duplicate explanations of those constitutions may be omitted.

First Embodiment

FIG. 1 is a left side view of a motorcycle according to a first embodiment.

As shown in FIG. 1, this embodiment is applied to a motorcycle 1 which is a saddle-riding type vehicle. A front wheel 2 of the motorcycle 1 is supported by lower end portions of a pair of right and left front forks 3. An upper portion of the right and left front forks 3 is supported by a head pipe 7 of a front end of a vehicle body frame 6 via a steering stem 4. A steering handle bar 5 is installed on a top bridge of the steering stem 4. A grip portion 5a gripped by a driver is provided on each of right and left outer portions of the handle bar 5. In the embodiment, it is assumed that the grip portion 5a extends in a vehicle width direction (a right and left direction). However, the grip portion 5a may extend obliquely with respect to the vehicle width direction.

The vehicle body frame 6 includes the head pipe 7, a main tube 8 which extends downward and rearward from the head pipe 7 at a center in the vehicle width direction, right and left pivot frames 9 which extend downward from a rear end of the main tube 8, and a seat frame 10 which extends rearward from the main tube 8 and the right and left pivot frames 9. A front end of a swing arm 11 is pivotally supported by the right and left pivot frame 9 to be swingable. A rear wheel 12 of the motorcycle 1 is supported at a rear end of the swing arm 11.

A fuel tank 18 is supported above the right and left main tubes 8. A front seat 19 and a rear seat cover 19a are supported above the seat frame 10. The front seat 19 and the rear seat cover 19a are disposed at the front and the rear behind the fuel tank 18. The surroundings of the seat frame 10 is covered with a rear cowl 10a. A power unit PU which is a prime mover of the motorcycle 1 is suspended below the right and left main tubes 8. The power unit PU is linked to the rear wheel 12 via a chain type transmission mechanism, for example.

The power unit PU integrally has an engine 13 located at a front portion and a transmission 21 located at a rear portion. The engine 13 is, for example, a multi-cylinder engine in which a rotation axis of a crankshaft 14 extends in the vehicle width direction. The engine 13 includes cylinders 16 which stand upward at a front portion of a crankcase 15.

A rear portion of the crankcase 15 is a transmission case 17 which accommodates the transmission 21. The transmission 21 is a stepped transmission.

Figure 2:
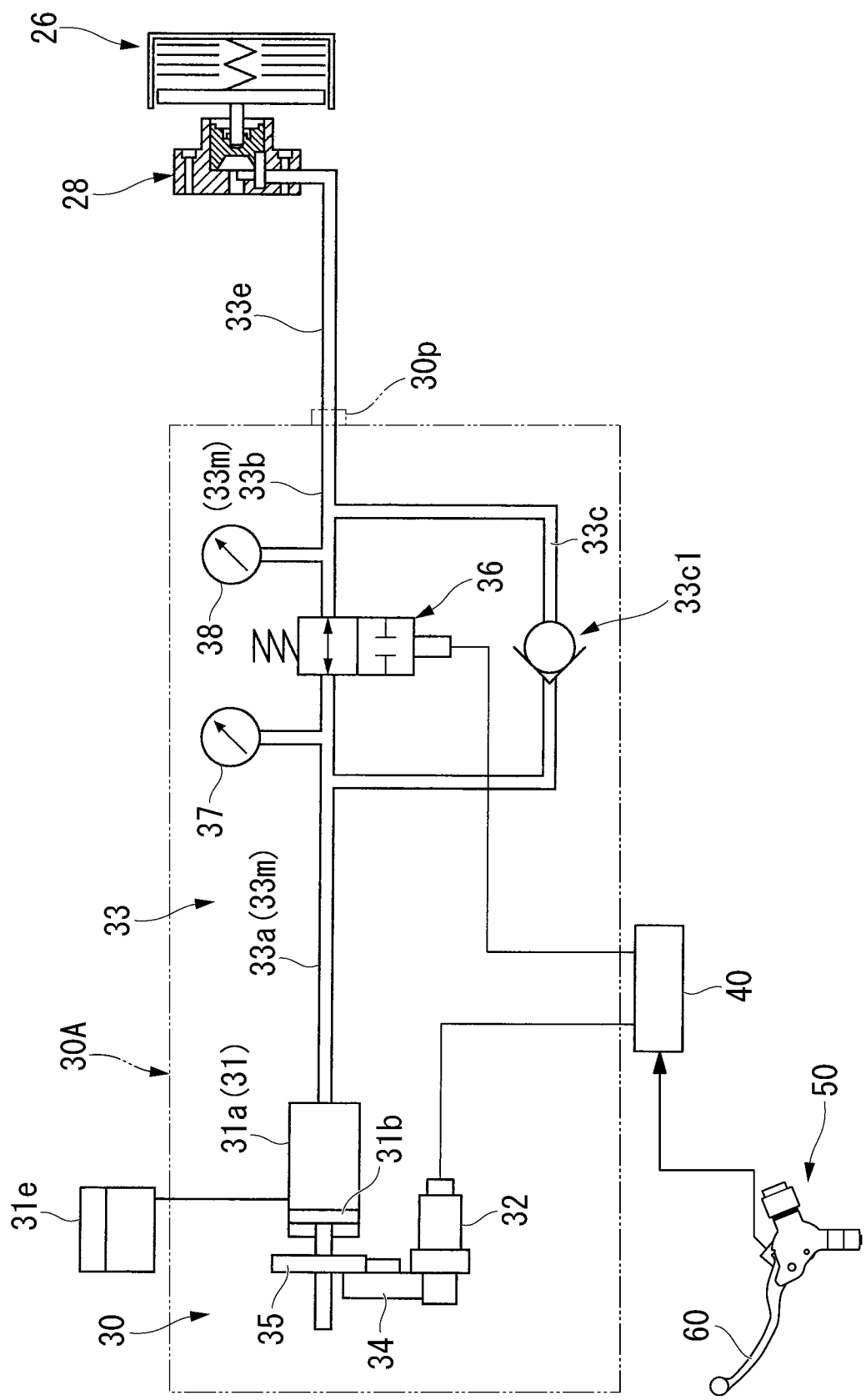
FIG. 2 is a schematic explanatory view of a clutch operation system including a clutch actuator.

FIG. 2 is a schematic explanatory view of a clutch operation system including a clutch actuator.

As shown in FIGS. 1 and 2, a clutch device 26 operated by a clutch actuator 30 is disposed in the transmission 21. The clutch device 26 is, for example, a wet type multi-disk clutch and is a so-called normal open clutch. That is, the clutch device 26 is brought into a connected state in which power can be transmitted due to hydraulic pressure supply from the clutch actuator 30 and then returns to a disconnected state in which power transmission is not possible when the hydraulic pressure supply from the clutch actuator 30 is stopped.

Rotational power of the crankshaft 14 is transmitted to the transmission 21 via the clutch device 26. A drive sprocket 27 of the chain type transmission mechanism is installed in the transmission 21.

Here, a transmission system of the motorcycle 1 includes the clutch actuator 30, an electronic control unit (ECU) 40, and a clutch lever device 50 (the lever device).

As shown in FIG. 2, as an operation of the clutch actuator 30 is controlled by the ECU 40, a fluid pressure by which the clutch device 26 is connected or disconnected can be controlled. The clutch actuator 30 includes an electric motor 32 (hereinafter, simply referred to as a motor 32) as a drive source, and a master cylinder 31 driven by the motor 32. The clutch actuator 30 constitutes an integral clutch control unit 30A together with a hydraulic circuit device 33 provided between the master cylinder 31 and a hydraulic supply/discharge port 30p.

The ECU 40 calculates a target value (target hydraulic pressure) of the hydraulic pressure to be supplied to a slave cylinder 28 to connect or disengage the clutch device 26 on the basis of a detection value of a rotation sensor 100 and a preset calculation program which will be described later. The ECU 40 controls the clutch control unit 30A so that the hydraulic pressure (a slave hydraulic pressure) on the slave cylinder 28 side which is detected by a downstream side hydraulic pressure sensor 38 approaches the target hydraulic pressure.

The master cylinder 31 causes stroking of a piston 31b in a cylinder body 31a due to driving of the motor 32 so that working oil in the cylinder body 31a can be supplied to and discharged from the slave cylinder 28. In the drawing, a reference numeral 35 indicates a conversion mechanism as a ball screw mechanism, a reference numeral 34 indicates a transmission mechanism extending across the motor 32 and the conversion mechanism 35, and a reference numeral 31e indicates a reservoir connected to the master cylinder 31.

The hydraulic circuit device 33 has a valve mechanism (a solenoid valve 36) for opening or blocking an intermediate portion of a main oil passage 33m extending from the master cylinder 31 to the clutch device 26 side (slave cylinder 28 side). The main oil passage 33m of the hydraulic circuit device 33 can be divided into an upstream side oil passage 33a located on the master cylinder 31 side of the solenoid valve 36 and a downstream side oil passage 33b located on the slave cylinder 28 side of the solenoid valve 36. The hydraulic circuit device 33 further includes a bypass oil passage 33c which bypasses the solenoid valve 36 and allows communication between the upstream side oil passage 33a and the downstream side oil passage 33b.

The solenoid valve 36 is a so-called normal open valve. A one-way valve 33c1 which allows the working oil to flow only in a direction from an upstream side to a downstream side is provided in the bypass oil passage 33c. An upstream side hydraulic pressure sensor 37 for detecting a hydraulic pressure of the upstream side oil passage 33a is provided on the upstream side of the solenoid valve 36. The downstream side hydraulic pressure sensor 38 for detecting a hydraulic pressure of the downstream side oil passage 33b is provided on the downstream side of the solenoid valve 36.

As shown in FIG. 1, the clutch control unit 30A is accommodated in the rear cowl 10a, for example. The slave cylinder 28 is installed on the rear left side of the crankcase 15. The clutch control unit 30A and the slave cylinder 28 are connected via a hydraulic pipe 33e (refer to FIG. 2).

As shown in FIG. 2, when the hydraulic pressure is supplied from the clutch actuator 30, the slave cylinder 28 operates the clutch device 26 such that it is brought into a connected state. When the hydraulic pressure supply is cut off, the slave cylinder 28 returns the clutch device 26 to the disconnected state.

In order to maintain the clutch device 26 in the connected state, it is necessary to continue the hydraulic pressure supply, but electric power is consumed correspondingly. Therefore, the solenoid valve 36 is provided in the hydraulic circuit device 33 of the clutch control unit 30A, and the solenoid valve 36 is closed after the hydraulic pressure is supplied to the clutch device 26 side. Accordingly, energy consumption is minimized by maintaining the hydraulic pressure supplied to the clutch device 26 side and supplementing the hydraulic pressure according to a pressure drop (recharging according to a leakage amount).

Figure 3:
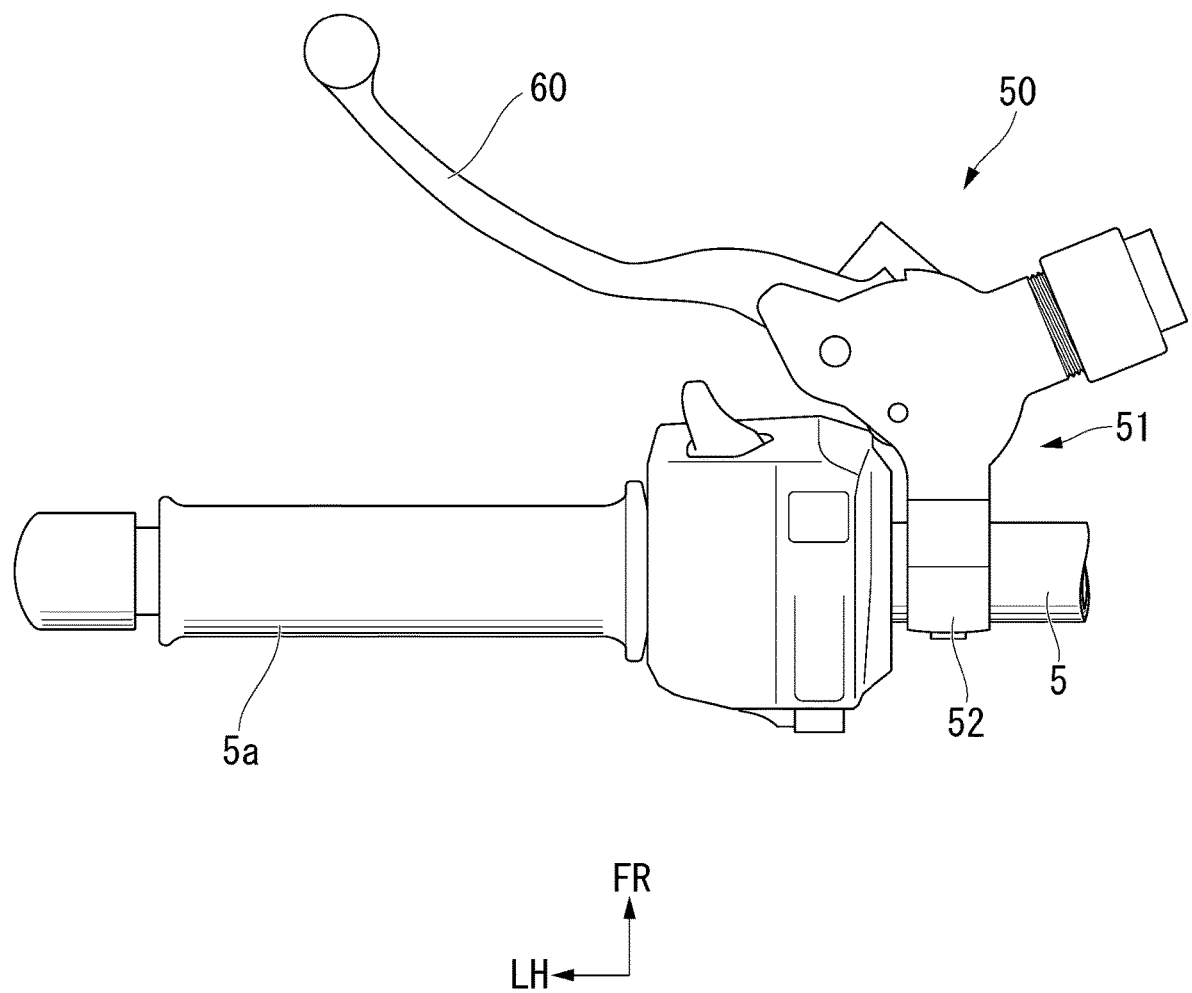
FIG. 3 is a plan view of the surroundings of a clutch lever device of the first embodiment.

FIG. 3 is a plan view of the surroundings of the clutch lever device of the first embodiment.

As shown in FIG. 3, the clutch lever device 50 is installed on the handle bar 5 to be parallel with the left grip portion 5a.

Figure 4:
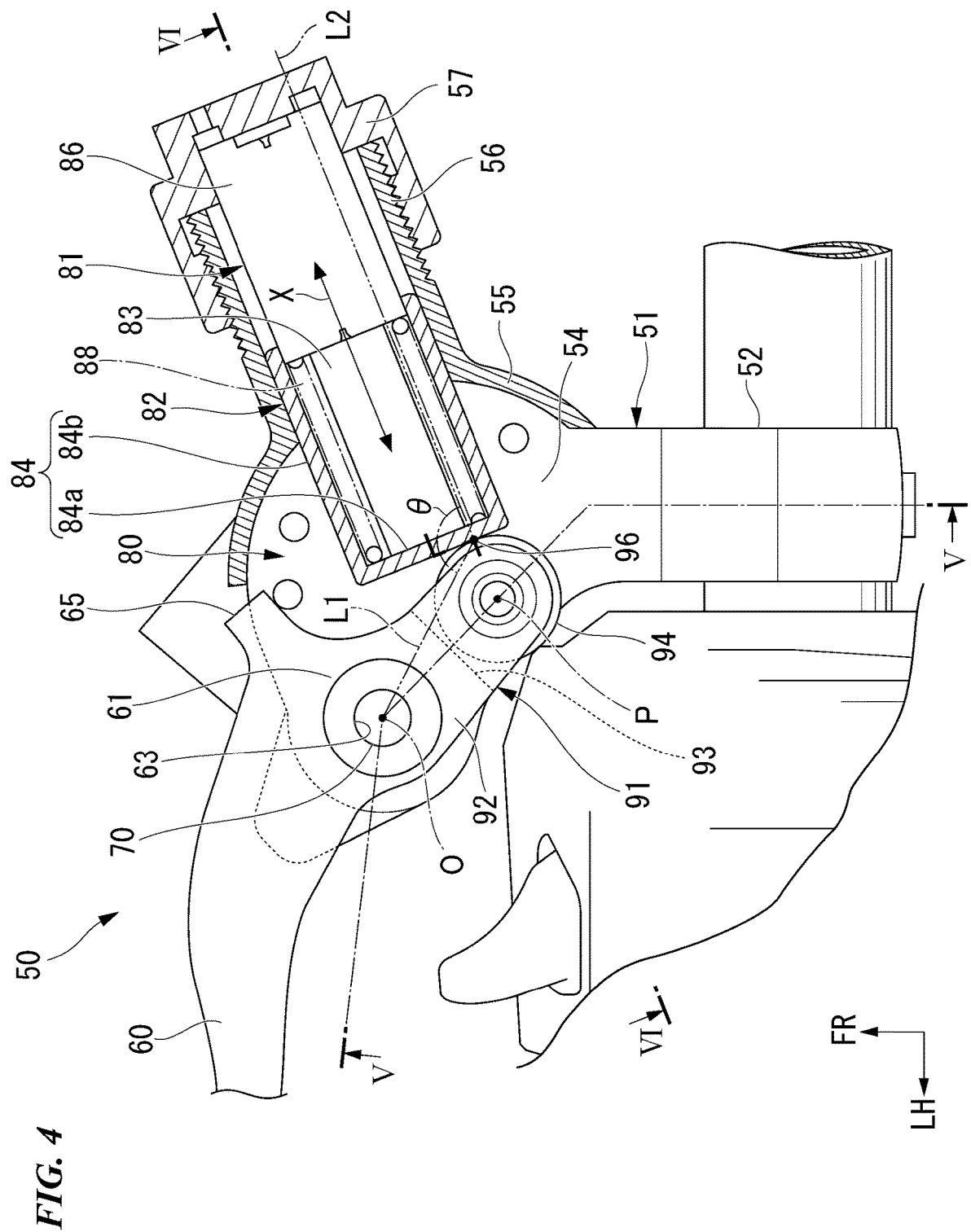
FIG. 4 is a partial cross-sectional view of the clutch lever device when seen from an upper side.
Figure 5:
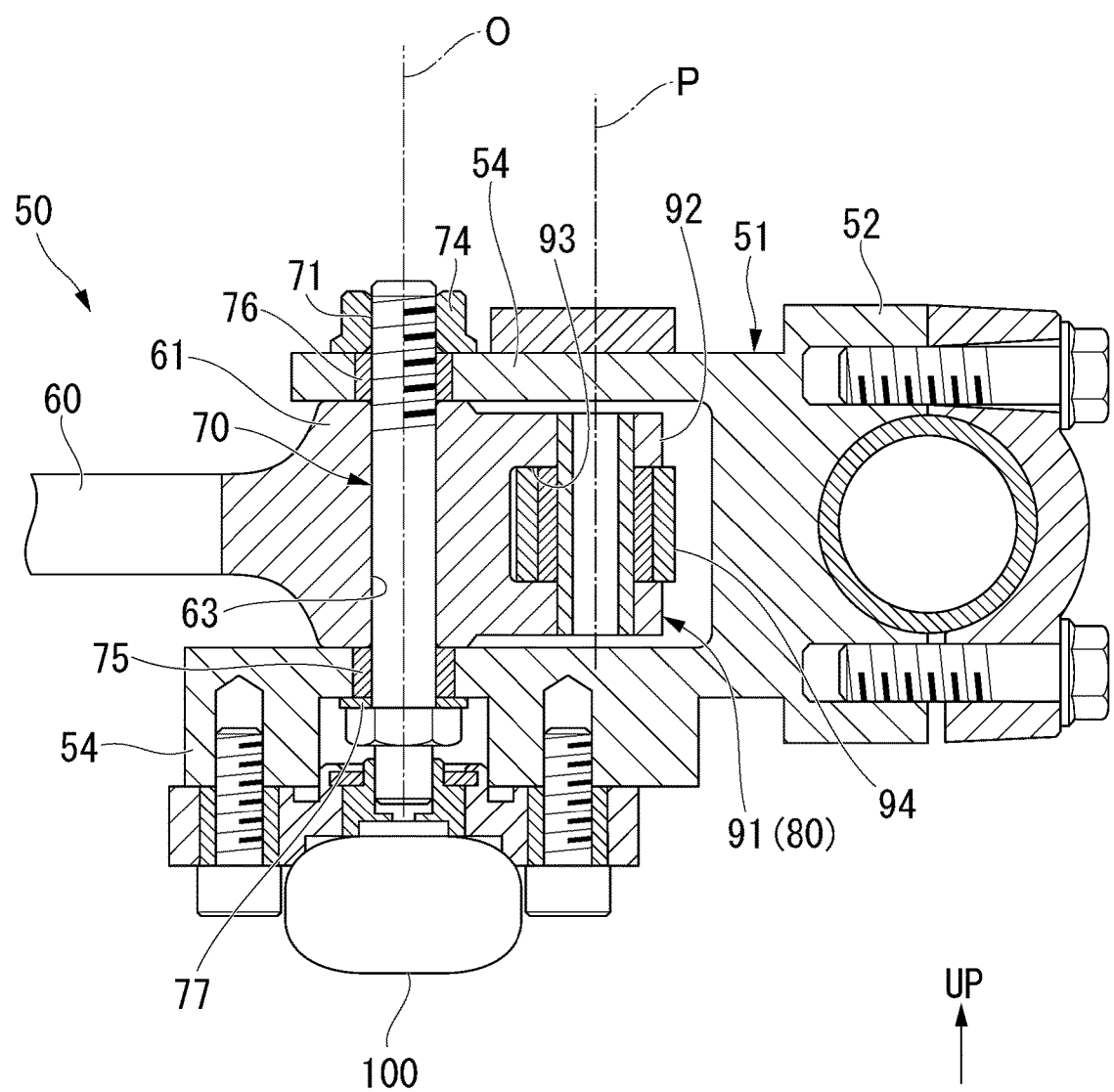
FIG. 5 is a cross-sectional view taken along line V-V of FIG. 4.

FIG. 4 is a partial cross-sectional view of the clutch lever device when seen from an upper side. FIG. 5 is a cross-sectional view of a portion corresponding to line V-V of FIG. 4.

As shown in FIGS. 4 and 5, the clutch lever device 50 includes a lever holder 51, a clutch lever 60, a reaction force applying unit 80, and a rotation sensor 100.

The lever holder 51 is installed on an inner side (a right side) in the vehicle widthwise direction with respect to the left grip portion 5a of the handlebar 5 (refer to FIG. 3). The lever holder 51 includes a fixing portion 52 which is fixed to the handlebar 5, a pair of holding plate portions 54 which extend from the fixing portion 52 to be parallel to each other with an interval therebetween in a vertical direction, and a connecting wall 55 which connects the pair of holding plate portions 54 with each other. In the embodiment, the holding plate portions 54 extend forward from the fixing portion 52. However, the holding plate portions 54 may extend downward and forward from the fixing portion 52, for example. As shown in FIG. 4, the pair of holding plate portions 54 extend forward from the fixing portion 52 and outward in the vehicle width direction. The connecting wall 55 extends from an end of the fixing portion 52 on an inner side in the vehicle width direction to connect end edges of the pair of holding plate portions 54. Specifically, the connecting wall 55 extends from the fixing portion 52 along an end edge of each of the holding plate portions 54 which faces inward in the vehicle width direction and forward. The reaction force applying unit 80 is disposed in a space (hereinafter, referred to as a space inside a holder) surrounded by the pair of holding plate portions 54 and the connecting wall 55.

Further, the lever holder 51 includes a placement portion 56 on which an elastic deformation portion 81 described later is disposed. The placement portion 56 is formed in a cylindrical shape and extends from the connecting wall 55 toward a side opposite to the space in the holder. The placement portion 56 opens into the space inside the holder. That is, the placement portion 56 is formed to extend from an opening edge of a through-hole formed in the connecting wall 55. A position of the placement portion 56 is appropriately adjusted according to a position of the elastic deformation portion 81.

The clutch lever 60 is a clutch operator operated by an operator (a user). The clutch lever 60 is disposed in front of the left grip portion 5*a* (refer to FIG. 3). The clutch lever 60 is rotatably supported by the lever holder 51. Specifically, a base portion 61 of the clutch lever 60 is disposed between the pair of holding plate portions 54 of the lever holder 51 and is supported by the pair of holding plate portions 54 via a support shaft 70 (refer to FIG. 5). The clutch lever 60 rotates around a first axis O. In the embodiment, the first axis O extends in the vertical direction. The clutch lever 60 extends outward from the base portion 61 in the vehicle width direction. In the following description of a shape of the clutch lever device 50, a state in which the clutch lever 60 is not operated (a state shown in FIG. 4) will be described unless otherwise noted. Further, in the following description, regarding a rotational position of the clutch lever 60, a position of a state in which the clutch lever 60 is not operated is referred to as a pre-operation position. Also, in the following description, a rotational direction of each component of the clutch lever device 50 is a direction seen from an upper side.

As shown in FIG. 5, a support shaft insertion hole 63 is formed in the base portion 61 of the clutch lever 60. The support shaft insertion hole 63 vertically passes through the base portion 61 along the first axis O. The support shaft insertion hole 63 is formed in a circular shape.

Further, as shown in FIG. 4, the clutch lever 60 includes a contact portion 65. The contact portion 65 comes into contact with a tip end of the connecting wall 55 of the lever holder 51 in the clockwise direction around the first axis O. Rotation of the clutch lever 60 in the clockwise direction around the first axis O is restricted by bringing the contact portion 65 into contact with the tip end of the connecting wall 55 of the lever holder 51. That is, the contact portion 65 and the connecting wall 55 of the lever holder 51 define a position of an end of a rotational range of the clutch lever 60 in the clockwise direction around the first axis O.

As shown in FIG. 5, the support shaft 70 is a bolt having a screw shaft 71 provided at a tip end. The support shaft 70 passes through the lever holder 51 and the clutch lever 60 from a lower side. Specifically, the support shaft 70 passes through the pair of holding plate portions 54 of the lever holder 51. Further, the support shaft 70 is inserted into the support shaft insertion hole 63 of the clutch lever 60. The support shaft 70 is installed in the lever holder 51 by screwing a nut 74 onto the screw shaft 71 protruding above the lever holder 51.

A first spacer 75 and a second spacer 76 are inserted onto the support shaft 70. The first spacer 75 is disposed between a bolt head portion of the support shaft 70 and the base portion 61 of the clutch lever 60 and is interposed between the support shaft 70 and the lower holding plate portion 54 of the lever holder 51. The second spacer 76 is disposed between the nut 74 and the base portion 61 of the clutch lever 60 and is interposed between the support shaft 70 and the upper holding plate portion 54 of the lever holder 51. The nut 74 is fastened to the base portion 61 of the clutch lever 60 via the second spacer 76. As a result, the base portion 61 of the clutch lever 60 is fixed to the support shaft 70 by a fastening force of the nut 74. That is, the support shaft 70 rotates integrally with the clutch lever 60. An upper portion (the screw shaft 71) of the support shaft 70 is slidably supported with respect to the upper holding plate portion 54 of the lever holder 51. A lower portion of the support shaft 70 is slidably supported via a washer 77 with respect to the lower holding plate portion 54 of the lever holder 51.

As shown in FIG. 4, the reaction force applying unit 80 applies an operation reaction force to the clutch lever 60. The reaction force applying unit 80 includes the elastic deformation portion 81 which is a generation source of an operation reaction force of the clutch lever 60, and a rotary body 91 which rotates around the first axis O in accordance with rotation of the clutch lever 60 and elastically deforms the elastic deformation portion 81.

The elastic deformation portion 81 is disposed inside the placement portion 56 of the lever holder 51. The elastic deformation portion 81 is disposed on a side opposite to a side on which the clutch lever 60 extends with respect to the first axis O (that is, on an inner side in the vehicle width direction). The elastic deformation portion 81 elastically deforms (expands and contracts) in a direction orthogonal to a direction of the first axis O. Hereinafter, a direction in which the elastic deformation portion 81 is elastically deformed is referred to as a first direction, and a sign X is given thereto. The elastic deformation portion 81 includes a piston 82 and a cylinder 86, and a biasing member 88 which biases the piston 82 against the cylinder 86. The cylinder 86 is formed in a cylindrical shape extending in the first direction X. The cylinder 86 is disposed so that a bottom portion thereof protrudes outward from a tip end of the displacement portion 56. The bottom portion of the cylinder 86 is held by a cap body 57. The cap body 57 is provided to close a tip end opening of the placement portion 56 and is fixed to the placement portion 56.

The piston 82 is a movable portion of the elastic deformation portion 81. The piston 82 is disposed closer to the space inside the holder than the cylinder 86. The piston 82 is displaceable in the first direction X with respect to the cylinder 86. Therefore, the elastic deformation portion 81 is elastically deformed in the first direction X. The piston 82 includes a shaft portion 83 slidably supported inside the cylinder 86, and a tubular portion 84 provided to cover the shaft portion 83. The shaft portion 83 is formed in a cylindrical shape and extends in the first direction X. The shaft portion 83 is provided to protrude from the cylinder 86. The tubular portion 84 is formed in a bottomed cylindrical shape and has a bottom wall portion 84*a* and a circumferential wall portion 84*b*. The bottom wall portion 84*a* is coupled to a tip end of the shaft portion 83. The bottom wall portion 84*a* extends from the tip end of the shaft portion 83 in a direction orthogonal to the first direction X. The circumferential wall portion 84*b* extends from an outer edge of the bottom wall portion 84*a* to the cylinder 86 side in the first direction X and surrounds the shaft portion 83. An inner diameter of the circumferential wall portion 84*b* substantially coincides with an outer diameter of the cylinder 86. The circumferential wall portion 84*b* is disposed with a gap from an outer circumferential surface of the shaft portion 83. The piston 82 and the cylinder 86 may constitute an oil damper.

The biasing member 88 biases the piston 82 against the cylinder 86 toward the space inside the holder. That is, the biasing member 88 acts to elongate the elastic deformation portion 81 in the first direction X. The biasing member 88 is a compression coil spring inserted onto the shaft portion 83 of the piston 82. The biasing member 88 is disposed between the shaft portion 83 of the piston 82 and the circumferential wall portion 84b of the tubular portion 84. A first end of the biasing member 88 is in contact with an end surface of the cylinder 86. A second end of the biasing member 88 is in contact with the bottom wall portion 84a of the tubular portion 84 of the piston 82.

The rotary body 91 is provided to be engageable with the elastic deformation portion 81. The rotary body 91 is in contact with a tip end of the piston 82 of the elastic deformation portion 81 in the counterclockwise direction around the first axis O at a contact point 96. The rotary body 91 elastically deforms the elastic deformation portion 81 by rotating around the first axis O. The rotary body 91 includes an arm 92 and a roller 94. The arm 92 extends from the base portion 61 of the clutch lever 60. In the embodiment, the arm 92 is integrally formed with the clutch lever 60. The arm 92 extends in a direction orthogonal to the direction of the first axis O. The arm 92 extends on a side opposite to a side on which the clutch lever 60 extends with respect to the base portion 61 of the clutch lever 60 (that is, on an inner side in the vehicle width direction). A tip end of the arm 92 is provided to face a tip end surface (the bottom wall portion 84a of the tubular portion 84) of the piston 82 of the elastic deformation portion 81. As shown in FIG. 5, a groove portion 93 is formed in the tip end of the arm 92. The groove portion 93 extends in the direction orthogonal to the first axis O. The groove portion 93 is formed to face the space inside the holder.

Figure 6:
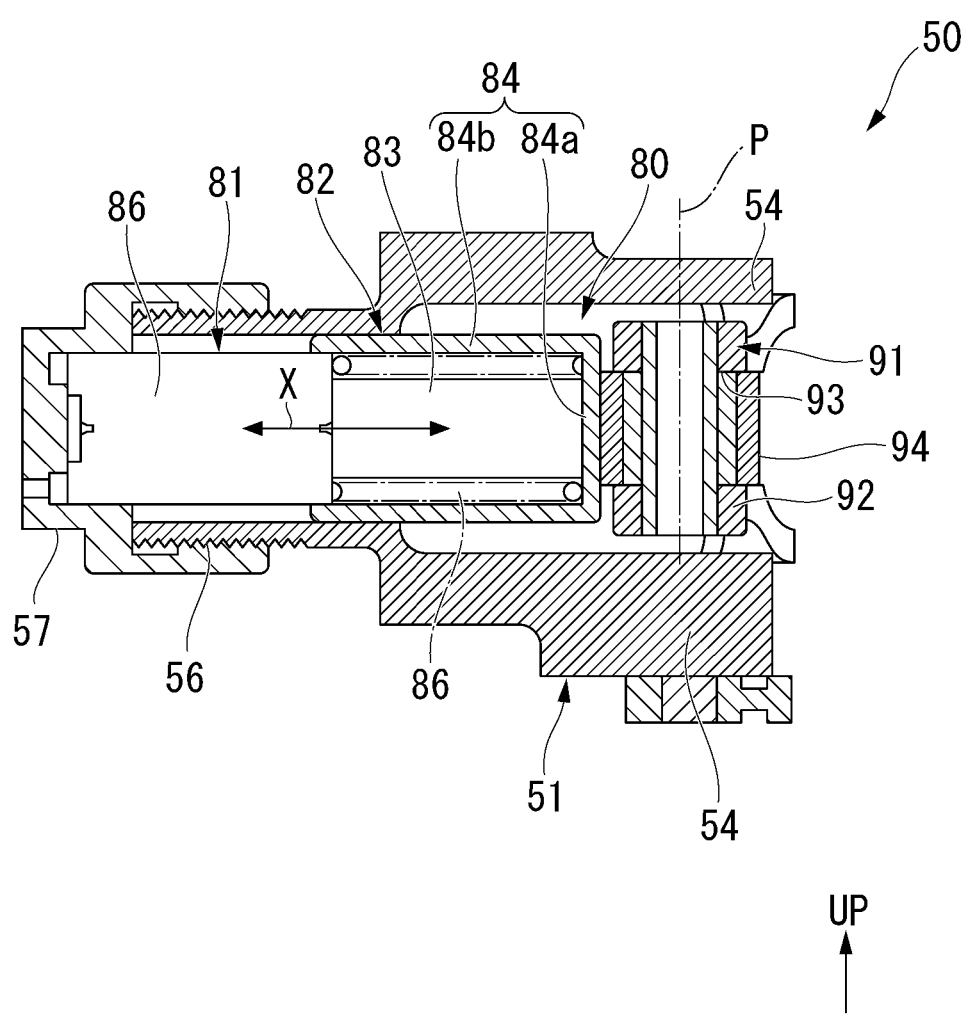
FIG. 6 is a cross-sectional view taken along line VI-VI of FIG. 4.

FIG. 6 is a cross-sectional view of a portion corresponding to line VI-VI of FIG. 4.

As shown in FIGS. 4 and 6, the roller 94 is disposed at a contact portion with the elastic deformation portion 81 of the rotary body 91. The roller 94 is disposed in the groove portion 93 of the tip end of the arm 92. The roller 94 is provided to be rotatable around a second axis P parallel to the first axis O. The roller 94 is formed in a cylindrical shape having the second axis P as a central axis. The roller 94 is disposed to protrude from the arm 92 in three directions including an extending direction of the arm 92 and directions toward both sides in a width direction of the arm 92 to form a tip end edge of the rotary body 91 when seen in the vertical direction.

Figure 7:
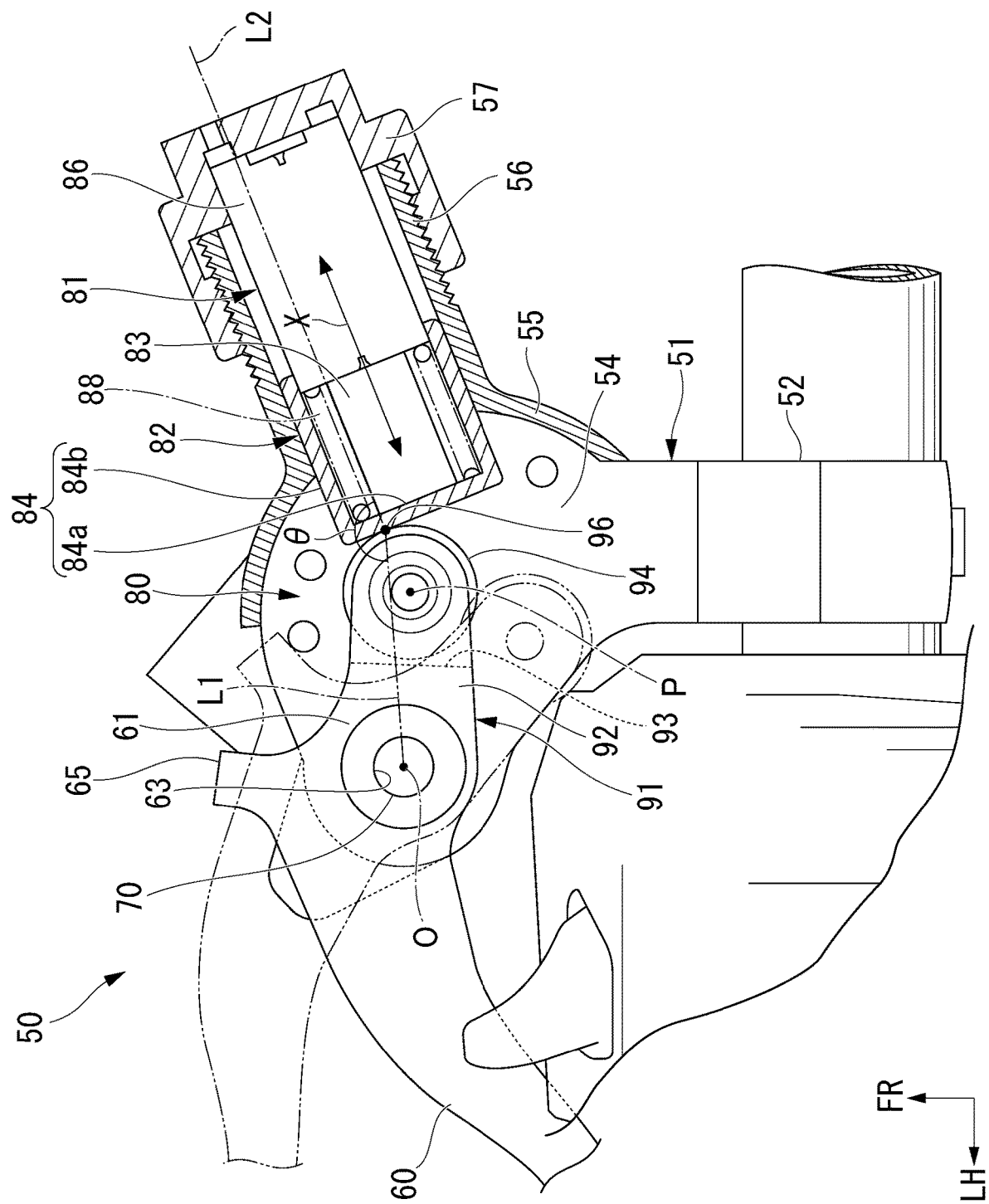
FIG. 7 is a partial cross-sectional view of the clutch lever device of the first embodiment when seen from the upper side.

FIG. 7 is a partial cross-sectional view of the clutch lever device of the first embodiment when seen from the upper side. A state in which the clutch lever 60 is not operated is shown in FIG. 4, whereas a state in which the clutch lever 60 is operated is shown in FIG. 7.

As shown in FIGS. 4 and 7, a line segment L1 connecting the first axis O and the contact point 96 between the rotary body 91 and the elastic deformation portion 81 is inclined with respect to the first direction X when seen in the vertical direction. An angle θ formed between the first direction X and the line segment L1 is equal to or more than 95° and equal to or less than 135° in the state in which the clutch lever 60 is not operated. The angle θ increases as a rotation angle from the pre-operation position of the clutch lever 60 increases. In the embodiment, the angle θ is a size of an angle between a half line L2 extending from the contact point 96 in a direction of a force acting from the rotary body 91 on the elastic deformation portion 81 in the first direction X, and a half line (corresponding to the line segment L1) extending from the contact point 96 toward the first axis O.

As shown in FIG. 5, the rotation sensor 100 is disposed below the base portion 61 of the clutch lever 60 and is installed on the holding plate portion 54 on a lower side of the lever holder 51. The rotation sensor 100 detects a rotation angle from the pre-operation position of the clutch lever 60. Hereinafter, the rotation angle from the pre-operation position of the clutch lever 60 is referred to as an operation amount of the clutch lever 60. The rotation sensor 100 converts the operation amount of the clutch lever 60 into an electric signal and outputs it. For example, the rotation sensor 100 is a so-called potentiometer. A rotation detector of the rotation sensor 100 is disposed coaxially with a rotation center (the first axis O) of the clutch lever 60 and is integrally rotatably connected to the support shaft 70. Since the support shaft 70 rotates integrally with the clutch lever 60, the operation amount of the clutch lever 60 is directly detected by the rotation sensor 100. The operation amount of the clutch lever 60 detected by the rotation sensor 100 is input to the ECU 40.

Next, the operation of the clutch lever device 50 of the embodiment will be described with reference to FIGS. 4 and 7.

When the power transmission of the clutch device 26 is disconnected, the clutch lever 60 is operated to rotate with respect to the pre-operation position in the counterclockwise direction around the first axis O. When the clutch lever 60 rotates in the counterclockwise direction, the rotary body 91 rotates in the counterclockwise direction. Since the rotary body 91 is in contact with the elastic deformation portion 81 in the counterclockwise direction around the first axis O, the piston 82 is pressed to compress the elastic deformation portion 81. Here, the piston 82 is biased by the biasing member 88 in the extending direction of the elastic deformation portion 81. Accordingly, a force in a direction opposite to a rotating direction acts on the rotary body 91. That is, the elastic deformation portion 81 acts to rotate the clutch lever 60 in the clockwise direction via the rotary body 91. As a result, an operation reaction force in a direction opposite to an operating direction is applied to the clutch lever 60.

Here, since the rotary body 91 is displaced in accordance with the rotation of the clutch lever 60, the angle θ formed between the first direction X and the line segment L1 also changes in accordance with the rotation of the clutch lever 60. Therefore, the rotary body 91 changes an elastic deformation amount of the elastic deformation portion 81 per unit rotation angle of the clutch lever 60 according to the operation amount of the clutch lever 60. Hereinafter, the elastic deformation amount of the elastic deformation portion 81 per unit rotation angle of the clutch lever 60 is referred to as an elastic deformation ratio of the elastic deformation portion 81. In the embodiment, the angle θ increases as the operation amount of the clutch lever 60 increases. Therefore, as the operation amount of the clutch lever 60 increases, the elastic deformation ratio of the elastic deformation portion 81 decreases. Accordingly, an increasing ratio of the operation reaction force with respect to an increase in the operation amount of the clutch lever 60 decreases as the operation amount of the clutch lever 60 increases.

Figure 8:
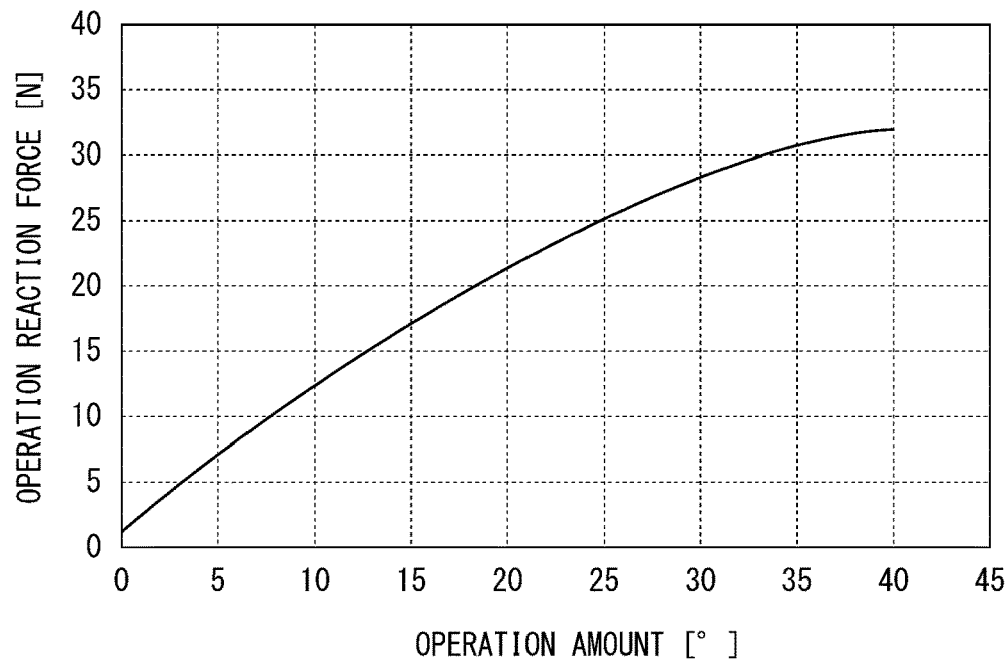
FIG. 8 is a graph showing an example of a change in an operation reaction force with respect to an operation amount of a clutch lever in the clutch lever device of the first embodiment.

FIG. 8 is a graph showing an example of a change in the operation reaction force with respect to the operation amount of the clutch lever in the clutch lever device of the first embodiment. In FIG. 8, a horizontal axis shows the operation amount of the clutch lever 60, and a vertical axis shows the operation reaction force applied to the clutch lever 60.

As shown in FIG. 8, the operation reactive force of the clutch lever 60 continuously and smoothly increases as the operation amount of the clutch lever 60 increases. Also, the increasing ratio of the operation reaction force with respect to the increase in the operation amount of the clutch lever 60 continuously and smoothly decreases as the operation amount of the clutch lever 60 increases. As a result, the operation reaction force of the clutch lever 60 changes non-linearly and continuously with respect to the operation amount of the clutch lever 60.

As described above, the clutch lever device 50 of the embodiment includes the elastic deformation portion 81 which is a generation source of the operation reaction force of the clutch lever 60, and the rotary body 91 which rotates around the first axis O in accordance with the rotation of the clutch lever 60 and elastically deforms the elastic deformation portion 81. The rotary body 91 changes the elastic deformation ratio of the elastic deformation portion 81 according to the operation amount of the clutch lever 60. According to such a constitution, since a restoring force of the elastic deformation portion 81 is transmitted to the clutch lever 60 via the rotary body 91, it is possible to apply the operation reaction force to the clutch lever 60. Further, since the elastic deformation ratio of the elastic deformation portion 81 varies according to the operation amount of the clutch lever 60, the rate of increase of the operation reaction force with respect to the increase in the operation amount of the clutch lever 60 can be arbitrarily set by appropriately setting a degree of change in the elastic deformation ratio of the elastic deformation portion 81. Therefore, the operation reaction force of the clutch lever 60 can be changed non-linearly and continuously with respect to the operation amount of the clutch lever 60. Thus, it is possible to allow the lever to be operated with no discomfort.

Further, when seen in the direction of the first axis O, the line segment L1 passing through the first axis O and the contact point 96 between the rotary body 91 and the elastic deformation portion 81 is inclined with respect to the first direction X. According to such a constitution, since the line segment L1 is displaced by the rotation of the rotary body 91, an inclination angle of the line segment L1 with respect to the first direction X changes in accordance with the operation amount of the clutch lever 60. Therefore, the elastic deformation ratio of the elastic deformation portion 81 can be changed in accordance with the operation amount of the clutch lever 60. Therefore, it is possible to constitute the clutch lever device 50 exhibiting the above-described operation and effect.

Further, the angle θ formed between the first direction X and the line segment L1 is equal to or more than 95° and equal to or less than 135° in the state in which the clutch lever 60 is not operated and increases as the operation amount of the clutch lever 60 increases. According to such a constitution, as the operation amount of the clutch lever 60 increases, the elastic deformation ratio of the elastic deformation portion decreases. As a result, the rate of increase of the operation reaction force of the clutch lever 60 decreases as the operation amount of the clutch lever 60 increases. Accordingly, the operation reaction force of the clutch lever 60 increases to gradually approach a predetermined value as the operation amount of the clutch lever 60 increases.

Figure 9:
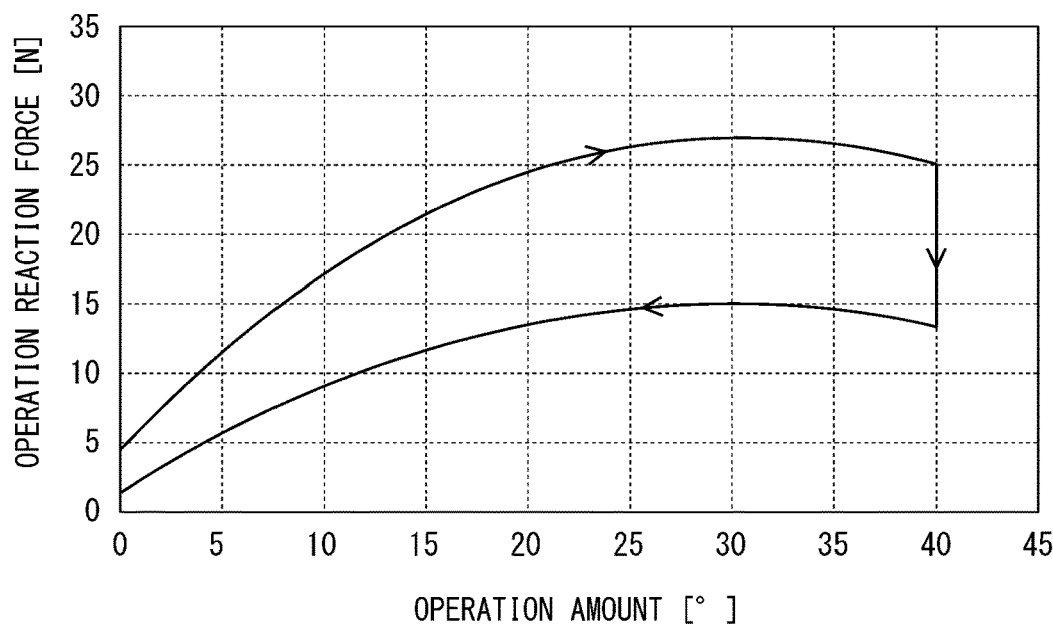
FIG. 9 is a graph showing a change in the operation reaction force with respect to the operation amount of the clutch lever in the clutch lever device of an example.
Figure 10:
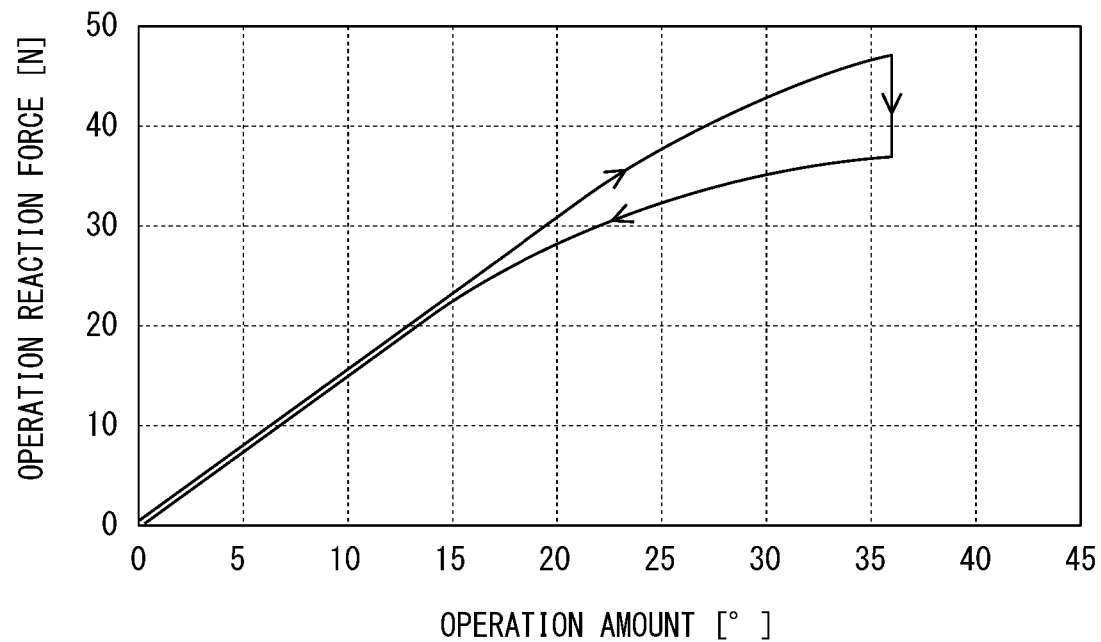
FIG. 10 is a graph showing a change in an operation reaction force with respect to an operation amount of a clutch lever in a clutch lever device of a first comparative example.
Figure 11:
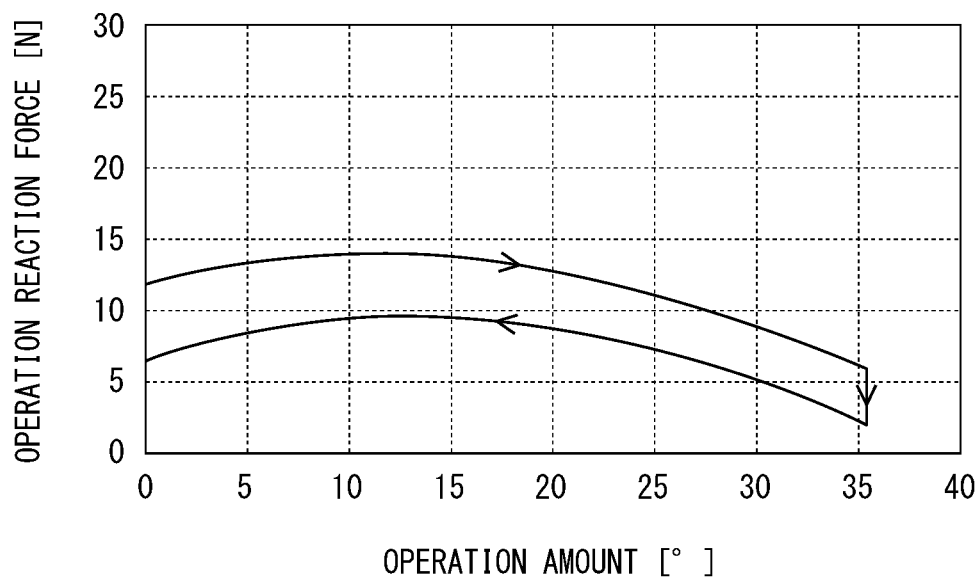
FIG. 11 is a graph showing a change in an operation reaction force with respect to an operation amount of a clutch lever in a clutch lever device of a second comparative example.

FIG. 9 is a graph showing a change in the operation reaction force with respect to the operation amount of the clutch lever in the clutch lever device of an example. FIG. 10 is a graph showing a change in the operation reaction force with respect to the operation amount of the clutch lever in a clutch lever device of a first comparative example. FIG. 11 is a graph showing a change in the operation reaction force with respect to the operation amount of the clutch lever in a clutch lever device of a second comparative example. In each of FIGS. 9 to 11, a horizontal axis shows the operation amount of the clutch lever, and a vertical axis shows the operation reaction force applied to the clutch lever. In the clutch lever device of the example, the angle θ is set to 115°. In the clutch lever device of the first comparative example, the angle θ is set to 90°. In the clutch lever device of the second comparative example, the angle θ is set to 140°.

As shown in FIG. 9, in the clutch lever device of the example, the operation reaction force of the clutch lever 60 continuously and smoothly increases as the operation amount of the clutch lever 60 increases. Further, the operation reaction force of the clutch lever 60 increases to gradually approach a predetermined value as the operation amount of the clutch lever 60 increases. On the other hand, as shown in FIG. 10, in the clutch lever device of the first comparative example, the operation reaction force of the clutch lever 60 increases in proportion to the operation amount of the clutch lever 60. Also, as shown in FIG. 11, in the clutch lever device of the second comparative example, the operation reaction force of the clutch lever 60 is substantially constant irrespective of the operation amount of the clutch lever 60.

Therefore, according to the embodiment, it is possible to approximate a characteristic in which the operation reaction force of the clutch lever 60 becomes substantially constant at the end of the operation, like an operation feeling of the clutch lever used in a conventional manual transmission.

As shown in FIGS. 9 to 11, in the clutch lever devices of the example and each of the comparative examples, hysteresis is generated in the operation reaction force at the time of canceling an input with respect to an input operation of the clutch lever 60. The hysteresis of the operation reaction force is caused by internal friction and so on occurring when an original shape of the elastic deformation portion 81 is restored. In the example shown in FIG. 9, the hysteresis becomes larger in a region in which the operation amount of the clutch lever 60 is relatively large, as compared with the comparative examples shown in FIGS. 10 and 11. Therefore, it is possible to maintain a position of the clutch lever 60 with a smaller force than that in the input operation in the state in which the operation amount of the clutch lever 60 is relatively large.

Further, the elastic deformation portion 81 is disposed on the side opposite to the side on which the clutch lever 60 extends with respect to the rotation center (the first axis O) of the clutch lever 60. Therefore, it is possible to minimize a size of the clutch lever device 50 becoming large in the direction in which the clutch lever 60 extends.

Further, the elastic deformation portion 81 includes the biasing member 88 which is a coil spring. Therefore, as the biasing member 88 is disposed in the first direction X, it is possible to form the elastic deformation portion 81 which elastically deforms in the first direction X and presses the rotary body 91 by the restoring force. Thus, the clutch lever device 50 can be formed with a simple structure.

Further, the roller 94 which is rotatable around the second axis P parallel to the first axis O is disposed at the contact portion of the rotary body 91 with the elastic deformation portion 81. According to such a constitution, the rotary body 91 can be brought into contact with the elastic deformation portion 81 without sliding when the rotary body 91 rotates. Therefore, it is possible to make the operation feeling of the clutch lever 60 smooth.

Further, the rotation sensor 100 is disposed coaxially with the rotation center of the clutch lever 60. According to such a constitution, the rotation sensor 100 can directly detect the rotation angle of the clutch lever 60. Therefore, the rotation angle of the clutch lever 60 can be accurately detected.

Further, the rotation sensor 100 is disposed below the base portion 61 of the clutch lever 60. Therefore, it is possible to prevent the rotation sensor from being disposed to protrude upward from the clutch lever 60 and hindering the operator.

Figure 12:
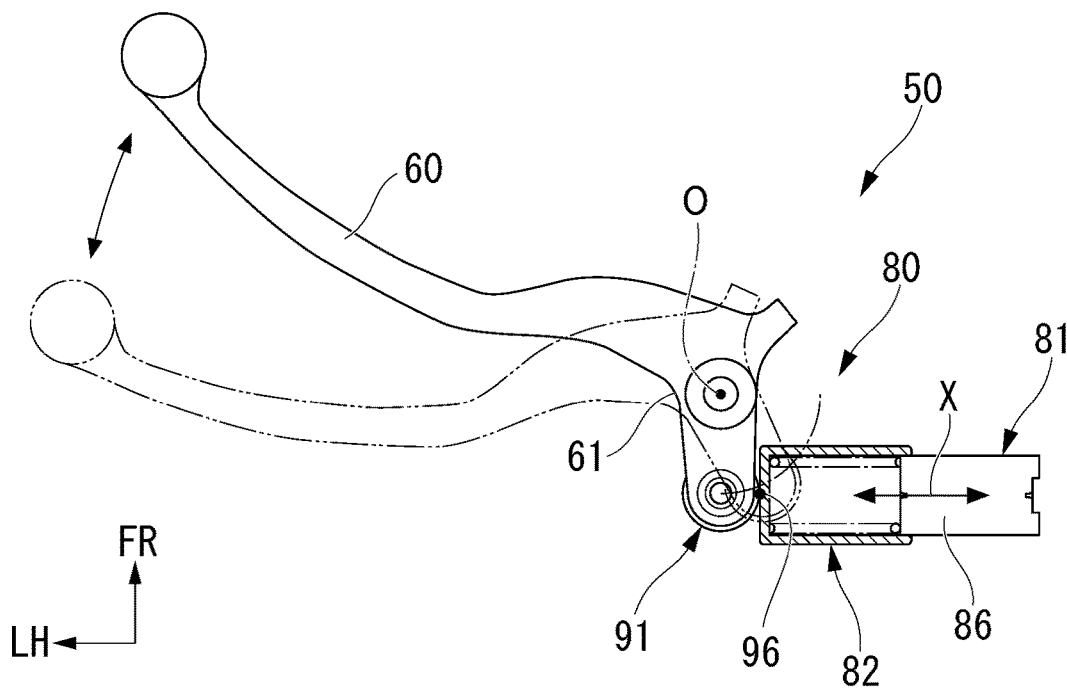
FIG. 12 is a plan view showing a schematic constitution of a clutch lever device according to a first modified example of the first embodiment.
Figure 13:
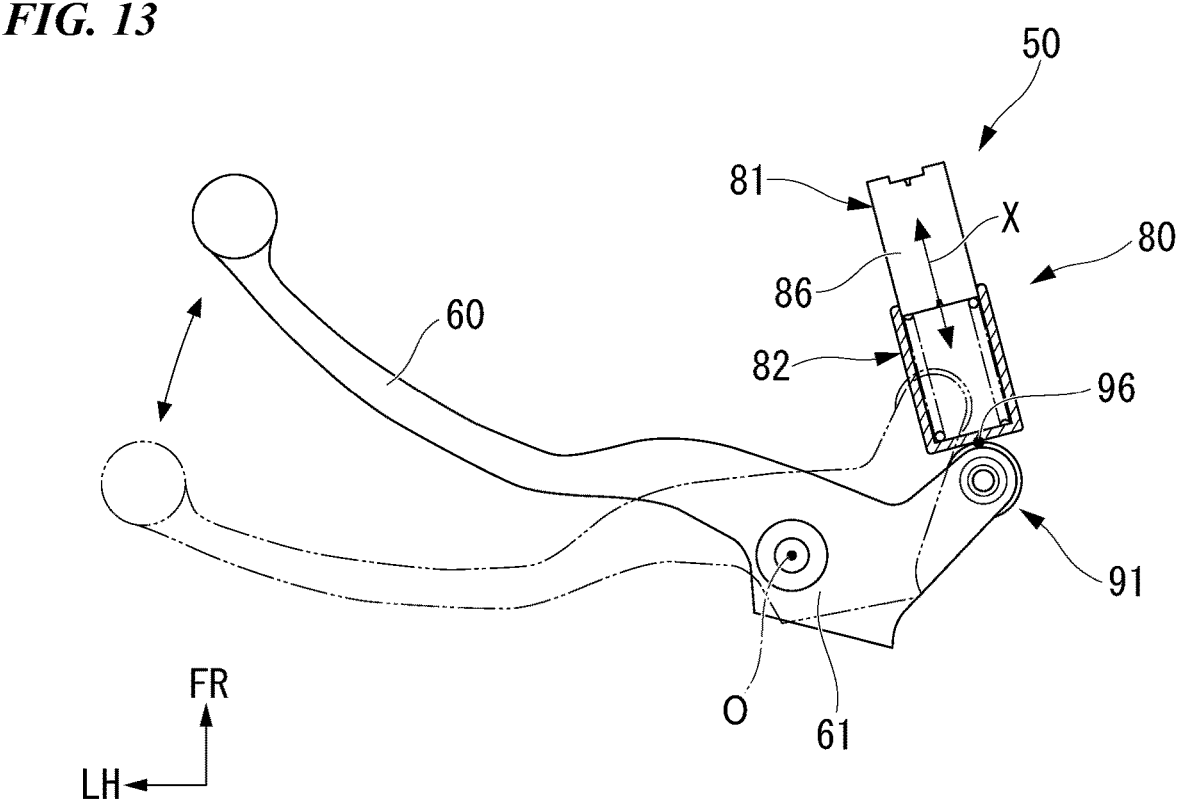
FIG. 13 is a plan view showing a schematic constitution of a clutch lever device according to the first modified example of the first embodiment.

The position of the elastic deformation portion 81 and the rotary body 91 with respect to the clutch lever 60 is not limited to the above-described first embodiment. For example, as shown in FIG. 12, the elastic deformation portion 81 may be disposed behind the base portion 61 of the clutch lever 60. Also, as shown in FIG. 13, the elastic deformation portion 81 may be disposed in front of the base portion 61 of the clutch lever 60.

Second Embodiment

Figure 14:
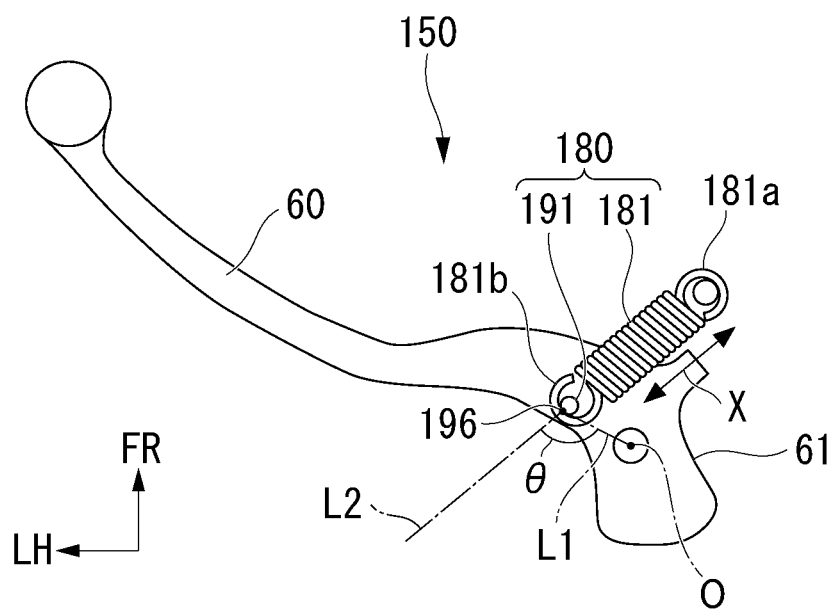
FIG. 14 is a plan view showing a schematic constitution of a clutch lever device according to a second embodiment.

FIG. 14 is a plan view showing a schematic constitution of a clutch lever device according to a second embodiment.

As shown in FIG. 14, the second embodiment is different from the first embodiment shown in FIG. 4 in that a tension coil spring is used as an elastic deformation portion 181.

As shown in FIG. 14, a reaction force applying unit 180 of a clutch lever device 150 includes an elastic deformation portion 181 which is a generation source of the operation reaction force of the clutch lever 60, and a rotary body 191 which rotates around the first axis O in accordance with the rotation of the clutch lever 60 and elastically deforms the elastic deformation portion 181.

The elastic deformation portion 181 is a tension coil spring. The elastic deformation portion 181 elastically deforms (expands and contracts) in the first direction X. The elastic deformation portion 181 includes a first end 181*a* fixed to a lever holder (not shown) or the like, and a second end 181*b* engaged with the rotary body 191. The first end 181*a* of the elastic deformation portion 181 is disposed at a position in the clockwise direction around the first axis O with respect to the second end 181*b*.

The rotary body 191 is a locking portion such as a pin provided on the clutch lever 60. The rotary body 191 is in contact with the second end 181*b* of the elastic deformation portion 181 in the counterclockwise direction around the first axis O at a contact point 196. The rotary body 191 elastically deforms the elastic deformation portion 181 by rotation.

Figure 15:
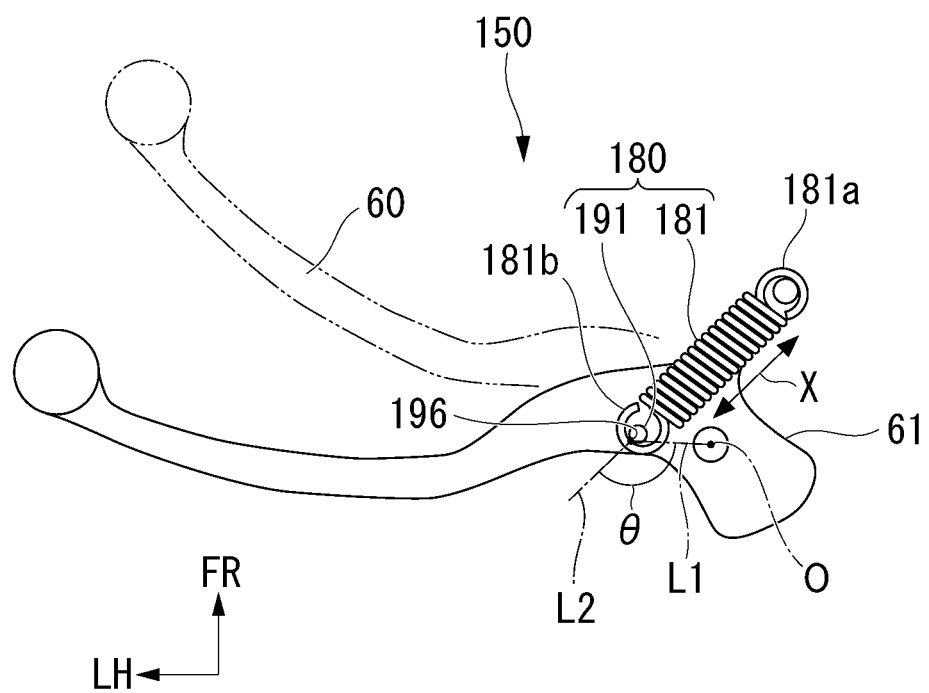
FIG. 15 is a plan view showing the schematic constitution of the clutch lever device according to the second embodiment.

FIG. 15 is a plan view showing the schematic constitution of the clutch lever device according to the second embodiment. The state in which the clutch lever 60 is not operated is shown in FIG. 14, whereas the state in which the clutch lever 60 is operated is shown in FIG. 15.

As shown in FIGS. 14 and 15, a line segment L1 passing through the first axis O and the contact point 196 between the rotary body 191 and the elastic deformation portion 181 is inclined with respect to the first direction X when seen in the vertical direction. An angle θ formed between the first direction X and the line segment L1 is equal to or more than 95° and equal to or less than 135° in the state in which the clutch lever 60 is not operated. The angle θ increases as the operation amount of the clutch lever 60 increases. In the embodiment, the angle θ is a size of an angle between a half line L2 extending from the contact point 196 in a direction of a force acting from the rotary body 191 on the elastic deformation portion 181 in the first direction X, and a half line (corresponding to the line segment L1) extending from the contact point 196 toward the first axis O.

Next, the operation of the clutch lever device 150 of the embodiment will be described with reference to FIGS. 14 and 15.

When the power transmission of the clutch device 26 is disconnected, the clutch lever 60 is operated to rotate with respect to the pre-operation position in the counterclockwise direction around the first axis O. When the clutch lever 60 rotates in the counterclockwise direction, the rotary body 191 rotates in the counterclockwise direction. Since the rotary body 191 is in contact with the elastic deformation portion 181 in the counterclockwise direction around the first axis O, the elastic deformation portion 181 is pulled to be elongated. Then, since a restoring force is generated in the elastic deformation portion 181, a force in a direction opposite to the rotating direction acts on the rotary body 191. That is, the elastic deformation portion 181 acts to rotate the clutch lever 60 in the clockwise direction via the rotary body 191. As a result, an operation reaction force in a direction opposite to an operating direction is applied to the clutch lever 60.

Here, since the rotary body 191 is displaced in accordance with the rotation of the clutch lever 60, the angle θ formed between the first direction X and the line segment L1 also changes in accordance with the rotation of the clutch lever 60. Therefore, the rotary body 191 changes an elastic deformation amount of the elastic deformation portion 181 per unit rotation angle of the clutch lever 60 according to the operation amount of the clutch lever 60. In the embodiment, the angle θ increases as the operation amount of the clutch lever 60 increases. Therefore, as the operation amount of the clutch lever 60 increases, the elastic deformation ratio of the elastic deformation portion 181 per unit rotation angle of the clutch lever 60 decreases. Accordingly, an increasing ratio of the operation reaction force with respect to an increase in the operation amount of the clutch lever 60 decreases as the operation amount of the clutch lever 60 increases.

As described above, the clutch lever device 150 of the embodiment includes the elastic deformation portion 181 which is a generation source of the operation reaction force of the clutch lever 60, and the rotary body 191 which rotates around the first axis O in accordance with the rotation of the clutch lever 60 and elastically deforms the elastic deformation portion 181. The rotary body 191 changes the elastic deformation amount of the elastic deformation portion 181 per unit rotation angle of the clutch lever 60 according to the operation amount of the clutch lever 60. According to such a constitution, it is possible to achieve the same operation and effect as those in the first embodiment.

The position of the elastic deformation portion 181 and the rotary body 191 with respect to the clutch lever 60 is not limited to the above-described second embodiment. For example, the rotary body 191 may be provided on an arm extending from the base portion 61 of the clutch lever 60.

The present invention is not limited to the above-described embodiments described with reference to the drawings, and various modifications are conceivable in the technical scope thereof.

For example, in the above-described embodiments, each of the rotary bodies 91 and 191 is provided on the clutch lever 60, but the present invention is not limited thereto. The rotary body may rotate in accordance with the rotation of the clutch lever. For example, the rotary body may be provided separately from the clutch lever, and a gear or the like for transmitting an operation torque of the clutch lever to the rotary body may be interposed between the rotary body and the clutch lever.

Further, in the above-described embodiment, although the clutch lever device 50 has been described as an example, the present invention may be applied to a brake lever device. In this case, in the brake lever device, for example, it may be constituted so that the rate of increase of the operation reaction force of the lever increases as the operation amount of the lever increases.

Further, in the above-described embodiment, each of the elastic deformation portions 81 and 181 include one coil spring, but the present invention is not limited thereto, and a plurality of coil springs may be provided. Furthermore, the elastic deformation portion may be formed to be elastically deformed by a restoring force of a disc spring, a leaf spring or the like.

In addition, it is possible to appropriately replace the elements in the above-described embodiments with well-known elements without departing from the spirit of the present invention.

INDUSTRIAL APPLICABILITY

According to the lever device described above, since the restoring force of the elastic deformation portion is transmitted to the lever via the rotary body, it is possible to apply the operation reaction force to the lever. Further, since the elastic deformation amount of the elastic deformation portion per unit rotation angle of the lever varies according to the operation amount of the lever, the rate of increase of the operation reaction force with respect to the increase in the operation amount of the lever can be arbitrarily set by appropriately setting the degree of change in the elastic deformation amount of the elastic deformation portion per unit rotation angle of the lever. Accordingly, the operation reaction force of the lever can be changed nonlinearly and continuously with respect to the operation amount of the lever. Therefore, it is possible to operate the lever without discomfort.

REFERENCE SIGNS LIST

50, 150 Clutch lever device (lever device)
60 Clutch lever (lever)
81, 181 Elastic deformation portion
91, 191 Rotary body
94 Roller
96, 196 Contact point
100 Rotation sensor
L1 Line segment
O First axis
P Second axis
X First direction

What is claim is:

1. A lever device comprising:
   a lever rotatably provided and operated by a user;
   a single elastic deformation portion which is a generation source of an operation reaction force of the lever; and
   a rotary body which is configured to rotate around a first axis in accordance with rotation of the lever and elastically deforms the elastic deformation portion,
   wherein the rotary body is configured to change an elastic deformation amount of the elastic deformation portion per unit rotation angle of the lever in accordance with a rotation angle from a pre-operation position of the lever, and
   as the operation amount of the lever increases, the elastic deformation amount of the elastic deformation portion per unit rotation angle of the lever decreases, and
   wherein a roller which is rotatable around a second axis parallel to the first axis is disposed at a contact portion of the rotary body with respect to the elastic deformation Portion.

2. The lever device according to claim 1, wherein the elastic deformation portion is formed to be elastically deformable in a first direction,
   the rotary body is provided to be engageable with the elastic deformation portion, and
   a line segment passing through the first axis and a contact point between the rotary body and the elastic deformation portion is inclined with respect to the first direction when seen in a direction of the first axis.

3. The lever device according to claim 2, wherein an angle between the first direction and the line segment is equal to or more than 95° and equal to or less than 135° in a state in which the lever is located at the pre-operation position and increases as an operation amount of the lever increases.

4. The lever device according to claim 1, wherein the elastic deformation portion is disposed on a side opposite to a side in which the lever extends with respect to a rotation center of the lever.

5. The lever device according to claim 1, wherein the elastic deformation portion comprises a coil spring.

6. The lever device according to claim 1, further comprising a rotation sensor which detects the rotation angle of the lever,
   wherein the rotation sensor is disposed coaxially with a rotation center of the lever.

7. The lever device according to claim 6, wherein the rotation sensor is disposed below the lever.

* * * * *